United States Patent
Xie et al.

(10) Patent No.: US 10,080,041 B2
(45) Date of Patent: Sep. 18, 2018

(54) METHOD AND DEVICE FOR SEPARATING REBROADCASTED VIDEO FROM LIVE DISPLAY VIDEO

(71) Applicant: SHENZHEN AOTUO ELECTRIC LTD., Shenzhen (CN)

(72) Inventors: Mingpu Xie, Shenzhen (CN); Shengcai Lu, Shenzhen (CN); Xuanzhong Li, Shenzhen (CN); Wuchang Liu, Shenzhen (CN); Zhenzhi Wu, Shenzhen (CN); Hanqu Wu, Shenzhen (CN)

(*) Notice: Subject to any disclaimer, the term of this patent is extended or adjusted under 35 U.S.C. 154(b) by 0 days.

(21) Appl. No.: 15/602,079

(22) Filed: May 22, 2017

(65) Prior Publication Data

US 2017/0257648 A1   Sep. 7, 2017

Related U.S. Application Data

(63) Continuation of application No. PCT/CN2015/099013, filed on Dec. 25, 2015.

(30) Foreign Application Priority Data

Nov. 20, 2015 (CN) .......................... 2015 1 0811728

(51) Int. Cl.
H04N 21/234    (2011.01)
H04N 21/258    (2011.01)
H04N 21/2187   (2011.01)

(52) U.S. Cl.
CPC ....... *H04N 21/234* (2013.01); *H04N 21/2187* (2013.01); *H04N 21/25841* (2013.01)

(58) Field of Classification Search
CPC ............. H04N 21/234; H04N 21/2187; H04N 21/25841
See application file for complete search history.

(56) References Cited

U.S. PATENT DOCUMENTS

| 9,270,515 | B1* | 2/2016 | Postelnicu | ............. | G11B 27/00 |
| 2004/0212731 | A1 | 10/2004 | Sie et al. | | |
| 2016/0007062 | A1* | 1/2016 | Rumreich | ............. | H04H 20/40 |
| | | | | | 725/116 |

FOREIGN PATENT DOCUMENTS

CN    101087376 A    12/2007
CN    102054460 A     5/2011
(Continued)

*Primary Examiner* — Sumaiya A Chowdhury
(74) *Attorney, Agent, or Firm* — Wayne & King LLC

(57) ABSTRACT

The present invention is applicable to the field of an LED display screen, and provides a method and device for separating a rebroadcasted video from a live display video, the method includes: feeding the rebroadcasted video and the live display video of the LED display screen into a video processor by two paths; completing an aliasing of two paths of the videos through the video processor, sending the aliased video to a LED display control system; controlling by the LED display control system a video ratio of the two paths of the videos, utilizing a high-speed camera to synchronously capture the rebroadcasted video according to the video ratio; receiving by the LED display control system the rebroadcasted video synchronously captured by the high-speed camera; and transforming by the LED display control system through image processing the rebroadcasted video into a video which is to be rebroadcasted to different countries. The present invention has the following two technical effects: on one hand, the present invention realizes the separation of the rebroadcasted video of the LED display screen from the live display video thereof around a stadium and meets different needs of different countries; on the other hand, the present invention is compatible with the LED video display technology in the prior art and can achieve a multi-purpose screen.

8 Claims, 8 Drawing Sheets

(56) References Cited

FOREIGN PATENT DOCUMENTS

| | | | |
|---|---|---|---|
| CN | 102790863 A | 11/2012 | |
| CN | 104469404 A | 3/2015 | |

\* cited by examiner

– 1 –
METHOD AND DEVICE FOR SEPARATING REBROADCASTED VIDEO FROM LIVE DISPLAY VIDEO

CROSS-REFERENCE TO RELATED APPLICATIONS

This application is a continuation of International Patent Application No. PCT/CN2015/099013 with a filing date of Dec. 25, 2015, designating the United States, now pending, and further claims priority to Chinese Patent Application No. 201510611728.7 with a filing date of Nov. 20, 2015. The content of the aforementioned applications, including any intervening amendments thereto, are incorporated herein by reference.

TECHNICAL FIELD

The present invention belongs to the field of a LED display screen, in particular to a method and device for separating a rebroadcasted video from a live display video.

BACKGROUND OF THE PRESENT INVENTION

Currently, a LED display screen has become a necessary supporting facility in a modern sports venues, in some major sporting events, especially the global sporting events, a display video of the LED display screen around the sports venues is directly rebroadcasted to various country, a rebroadcasted video is the same as a live display video.

However, different countries have different needs for the rebroadcasted video of the LED display screen, it has become a new demand for the display screen around the current stadium to rebroadcast different videos to different countries. However, the LED display screen in the prior art cannot achieve the separation of the display video from the rebroadcasted video, cannot rebroadcast different videos to different countries, and cannot meet the above new needs due to the restriction of the display video of the live LED display screen.

SUMMARY OF PRESENT INVENTION

An example of the present invention aims at providing a method for separating a rebroadcasted video from a live video display, and at solving the problems that the LED display screen in the prior art cannot separate display contents from the rebroadcasted video, cannot rebroadcast the different contents for different countries and is restricted to the display contents of the live LED display screen.

The example of the invention is realized as follows: a method for separating a rebroadcasted video from a live display video comprises: feeding the rebroadcasted video and the live display video of a LED display screen into a video processor by two paths;

completing an aliasing of two paths of the videos through the video processor, sending the aliased video to a LED display control system;

controlling by the LED display control system a video ratio of the two paths of the videos, utilizing a high-speed camera to synchronously capture the rebroadcasted video according to the video ratio;

receiving by the LED display control system the rebroadcasted video synchronously captured by the high-speed camera; and transforming by the LED display control system through image processing the rebroadcasted video into a video which is to be rebroadcasted to different countries.

Another object of the example of the present invention is to provide a device for separating a rebroadcasted video from a live display video, comprising:

a feeding module used for feeding a rebroadcasted video and a live display video of a LED display screen to a video processor by two paths;

a sending module used for completing an aliasing of two paths of the videos through the video processor and sending the aliased video to the LED display control system;

a control module used for the LED display control system controlling a video ration of two paths of the videos and utilizing a high-speed camera to synchronously capture the rebroadcasted video according to the video ratio;

a transferring module used for the LED display control system receiving the rebroadcasted video synchronously captured by the high-speed camera; and a rebroadcasting module used for the LED display control system transforming the rebroadcasted video through image processing into a video which, is to be rebroadcasted to different countries.

In the example of the invention, the LED display control system transforms the rebroadcasted video through image processing into a video which is to be rebroadcasted to different countries, and solves the problems that the LED display screen in the prior art cannot achieve the separation of the display video from the rebroadcasted video, cannot rebroadcast different videos to different countries, and is restricted by the display video of the live LED display screen. Its technical effects lie in the following two aspects: on the one hand, for different countries, the present invention realizes the separation of the rebroadcasted video from the live display contents of the LED display screen around the stadium, different countries can rebroadcast different contents to meet their different needs; on the other hand, the present invention is compatible with the LED video display technology in the prior art, can reduce unnecessary additional expenses, and achieves a multi-purpose screen.

DETAILED DESCRIPTION OF PREFERRED EMBODIMENTS

In order that the objects, technical solutions and advantages of the present invention will become more apparent, the present invention will be described in more detail with reference to the accompanying drawings and examples. It is to be understood that the specific examples described herein are for the purpose of explaining the present invention and are not intended to limit the invention.

Example 1

Figure 1:
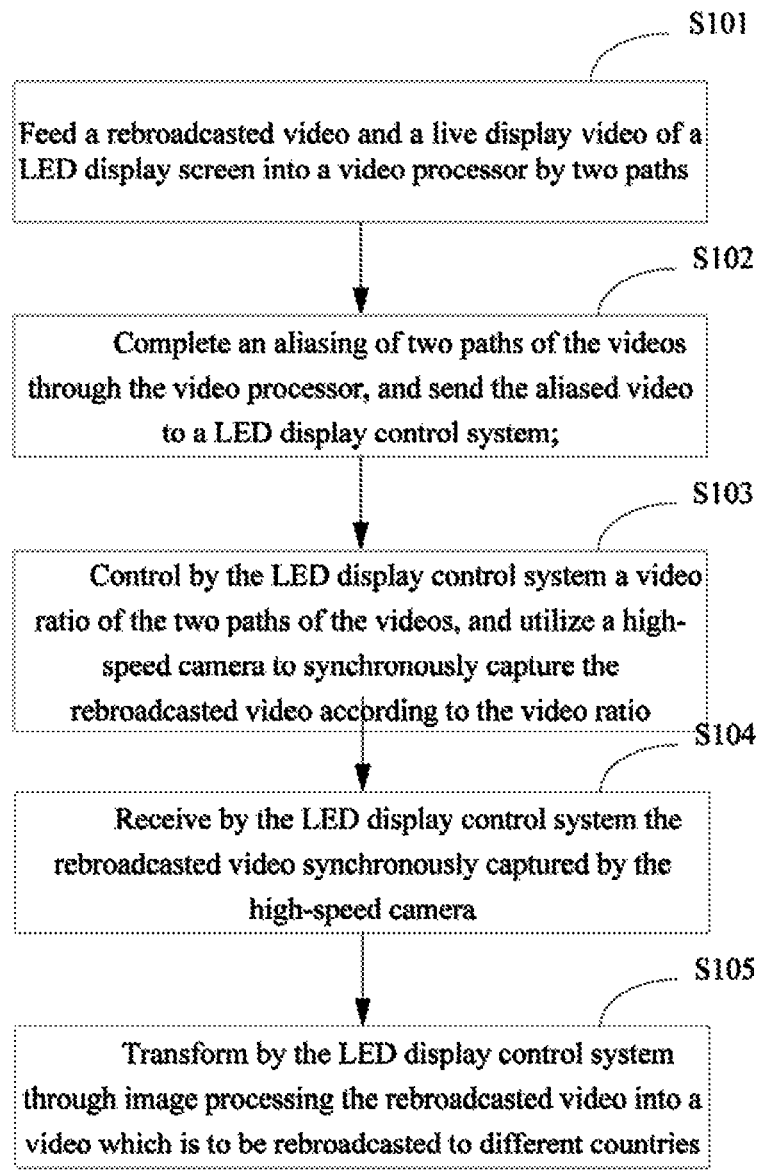
FIG. 1 is a realization flow chart of a method for separating a rebroadcasted video from a live display video provided by an example of the present invention.

FIG. 1 is a realization flow chart of a method for separating a rebroadcasted video from a live display video provided by an example of the present invention, the detailed description is as follow:

in Step S101, feeding a rebroadcasted video and a live display video of a LED display screen into a video processor by two paths;

before Step S101, the method further comprises:

arranging a rebroadcasted video channel and a live display video channel;

feeding a rebroadcasted video into a video processor with the arranged rebroadcasted video channel; and feeding a live display video into the video processor with the arranged live display video channel;

in Step S102, completing an aliasing of two paths of the videos through the video processor sending the abased video to a LED display control system; and in Step S103, controlling by the LED display control system a video ratio of the two paths of the videos, utilizing a high-speed camera to synchronously capture the rebroadcasted video according to the video ratio;

wherein the video ratio comprises a video ratio of the rebroadcasted video and a video ratio of the live display video.

in Step S104, receiving by the LED display control system the rebroadcasted video synchronously captured by the high-speed camera;

in Step S105, transforming by the LED display control system through image processing the rebroadcasted video into a video which is to be rebroadcasted to different countries.

In the example of the present invention, its technical effects lie in the following two aspects: on the one hand, for different countries, the present invention realizes the separation of the rebroadcasted video from the live display contents of the LED display screen around the stadium, different countries can rebroadcast different contents to meet their different needs; on the other hand, the present invention is compatible with the LED video display technology in the prior art, can reduce unnecessary additional expenses and achieves a multi-purpose screen, meanwhile, the present invention has sufficient flexibility and can design different video ratio according to different is to meet the needs of different scenarios.

Example 2

Figure 2:
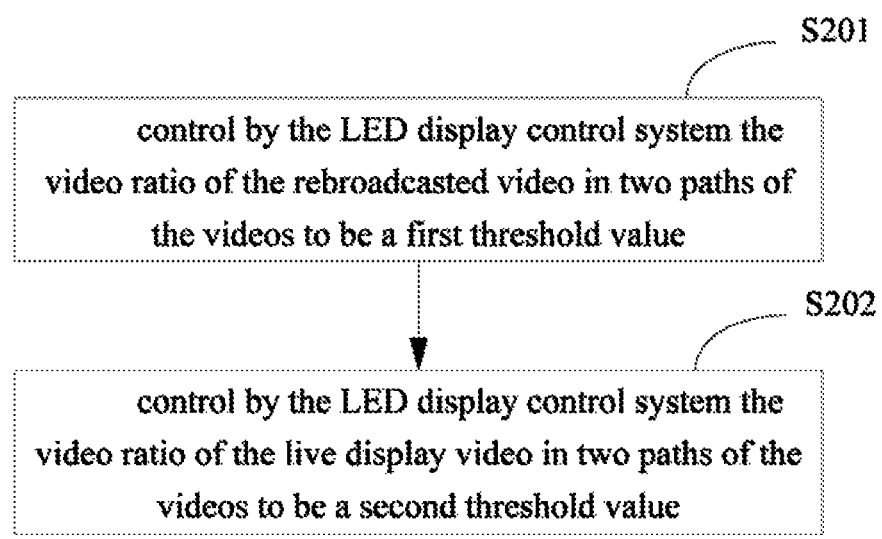
FIG. 2 is a realization flow chart of Step S103 of a method for separating a rebroadcasted video from a live display video provided by an example of the present invention.

FIG. 2 is a realization flow chart of Step S103 of a method for separating a rebroadcasted video from a live display video provided by an example of the present invention, the detailed description is as follows:

in Step S201, controlling by the LED display control system the video ratio of the rebroadcasted video in two paths of the videos to be a first threshold value; and in Step S202, controlling by the LED display control system the video ratio of the live display video in two paths of the videos to be a second threshold value;

wherein the first threshold value is different from the second threshold value, the first threshold value is smaller than the second threshold value.

Example 3

Figure 3:
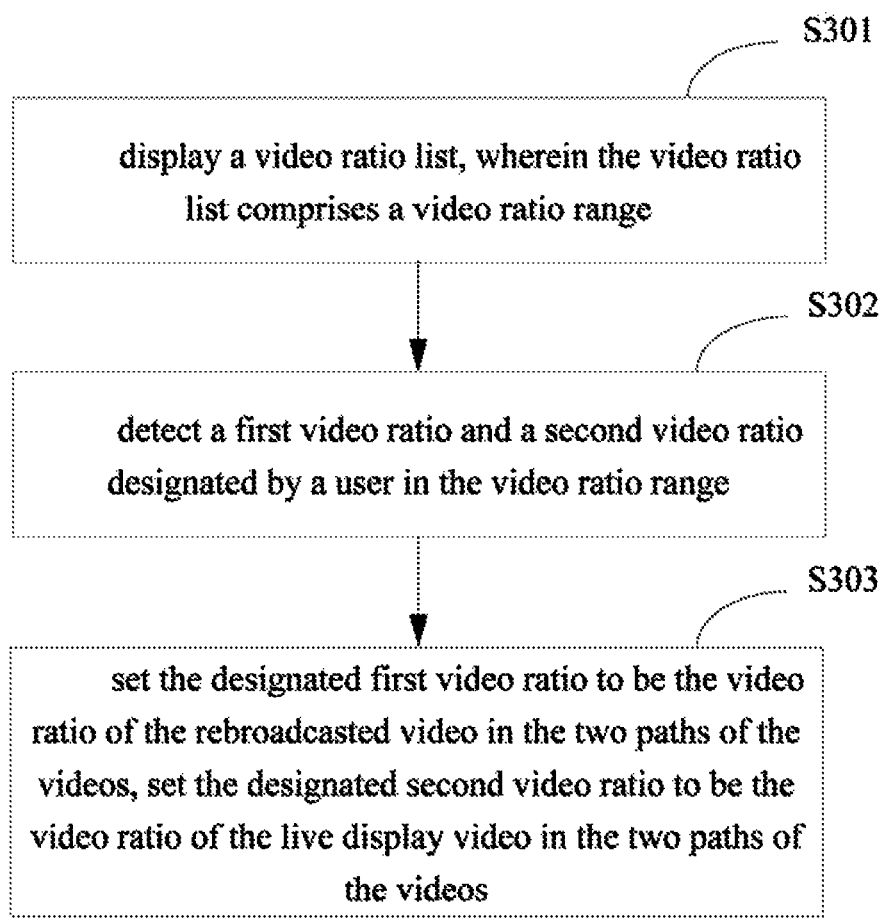
FIG. 3 is a realization flow chart of an arrangement of a function capable of a video ratio provided by an example of the present invention.

FIG. 3 is a realization flow chart of n arrangement of a function capable of a video ratio provided by an example of the present invention, the detailed description is as follows:

in Step S301, displaying a video ratio list, wherein the video ratio list comprises a video ratio range;

in Step S302, detecting a first video ratio and a second video ratio designated by a user in the video ratio range; and in Step S303, setting the designated first video ratio to be the video ratio of the rebroadcasted video in the two paths of the videos, setting the designated second video ratio to be the video ratio of the live display video in the two paths of the videos.

Example 4

Figure 4:
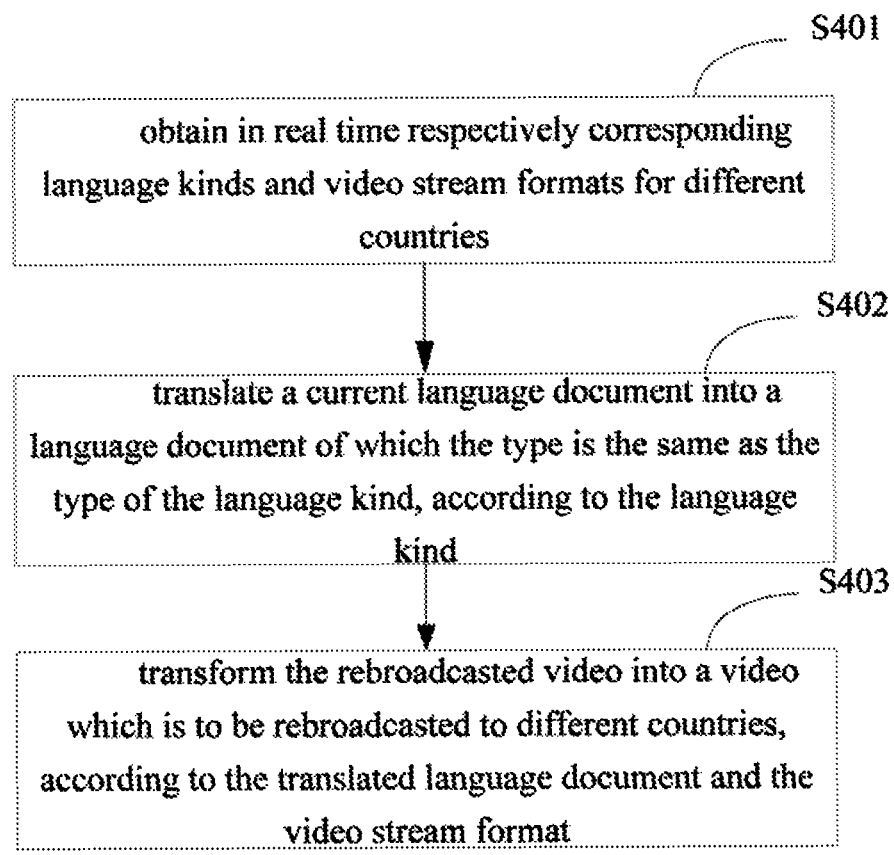
FIG. 4 is a realization flow chart of Example 2 of Step S103 of a method for separating a rebroadcasted video from a live display video provided by an example of the present invention.

An example of the present invention describes two embodiments of Step S105, the detailed description is as follows:

for the first embodiment, replacing a rebroadcasted video with newly added video;

for the second embodiment, refer to FIG. 4, FIG. 4 is a realization flow chart of the second example of Step S105 of a method for separating a rebroadcasted video from a live display video provided by an example of the present invention; the detailed description is as follows:

in Step S401, obtaining in real time respectively corresponding language kinds and video stream formats for different countries;

in Step S402, translating a current language document into a language document of which the type is the same as the type of the language kind, according to the language kind; and in Step S403, transforming the rebroadcasted video into a video which is to be rebroadcasted to different countries, according to the translated language document and the video stream format.

Example 5

Figure 5:
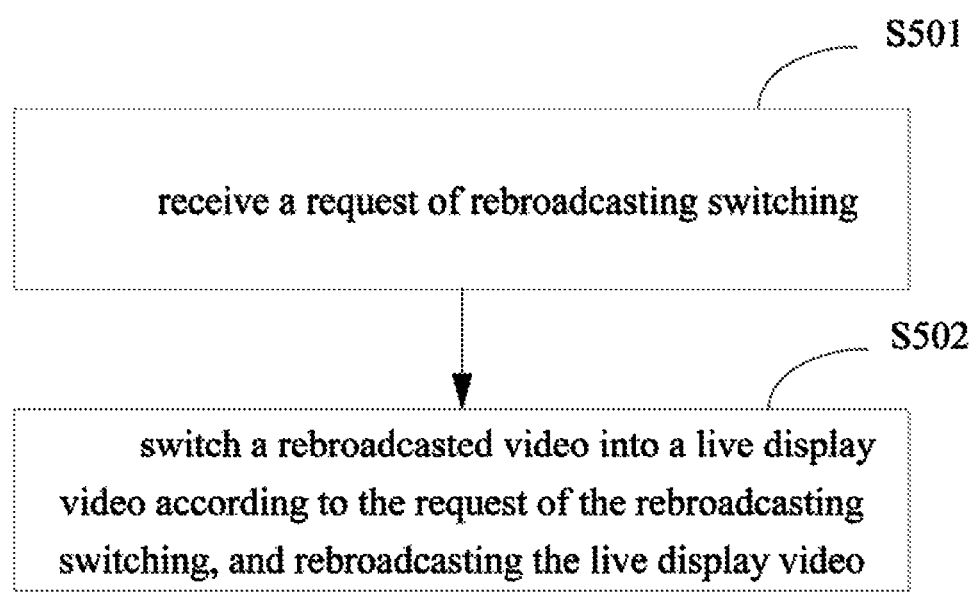
FIG. 5 is a realization flow chart of an arrangement of a function of rebroadcasting switching provided by an example of the present invention.

FIG. 5 is a realization flow chart of an, arrangement of a function of rebroadcasting switching provided by an example of the present invention; the detailed description is as follows:

in Step S501, receiving a request of rebroadcasting switching; and in Step S502, switching a rebroadcasted video into a live display video according to the request of the rebroadcasting switching, and rebroadcasting the live display video.

Example 6

Figure 6:
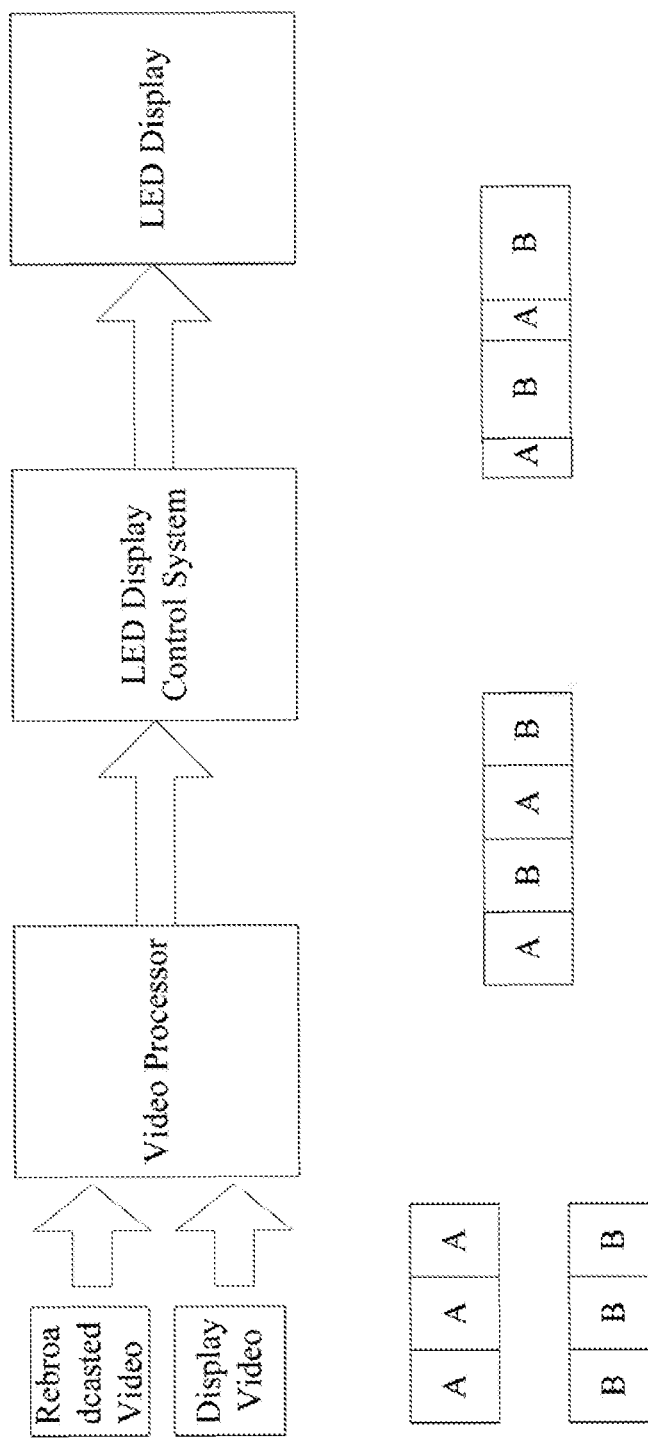
FIG. 6 is a realization flow chart of an arrangement of a function of rebroadcasting switching provided by an example of the present invention.

FIG. 6 is a realization flow chart of an arrangement of a function of rebroadcasting switching provided by an example of the present invention; the detailed description is as follows:

first feeding a rebroadcasted video A and a live display video B of a LED display screen into a video processor by two paths, completing an aliasing of two paths of the videos through the video processor and sending the aliased video output by the video processor to the LED display control system;

controlling flexibly by the LED display control system a video ratio of two paths of the videos, wherein a ratio of the live display video B is much bigger than that of the rebroadcasted video A;

capturing synchronously by a high-speed camera the rebroadcasted video A with the smaller video ratio, wherein the audience on the site, may still see the live display video B with a high refresh rate and a bigger ratio;

sending in real time by the high-speed camera the rebroadcasted video A captured synchronously to the rebroadcasting LED display control system at a background; and replacing the captured rebroadcasted video A by the LED display control system through a specific image processing with a video which is to be rebroadcasted to different countries, so that different display videos are rebroadcasted to different countries. meanwhile, switching is carried out according to needs and the live display video B is directly rebroadcasted;

In addition, the LED display control system may also achieve compatibility with the video display technology in the prior art, when a separation function is not initiated, the LED display is normally played, an input video is not processed (single-channel vide input or double-channel video input);

When this function is initiated, the ratios of the two paths of input videos are controlled.

Example 7

Figure 7:
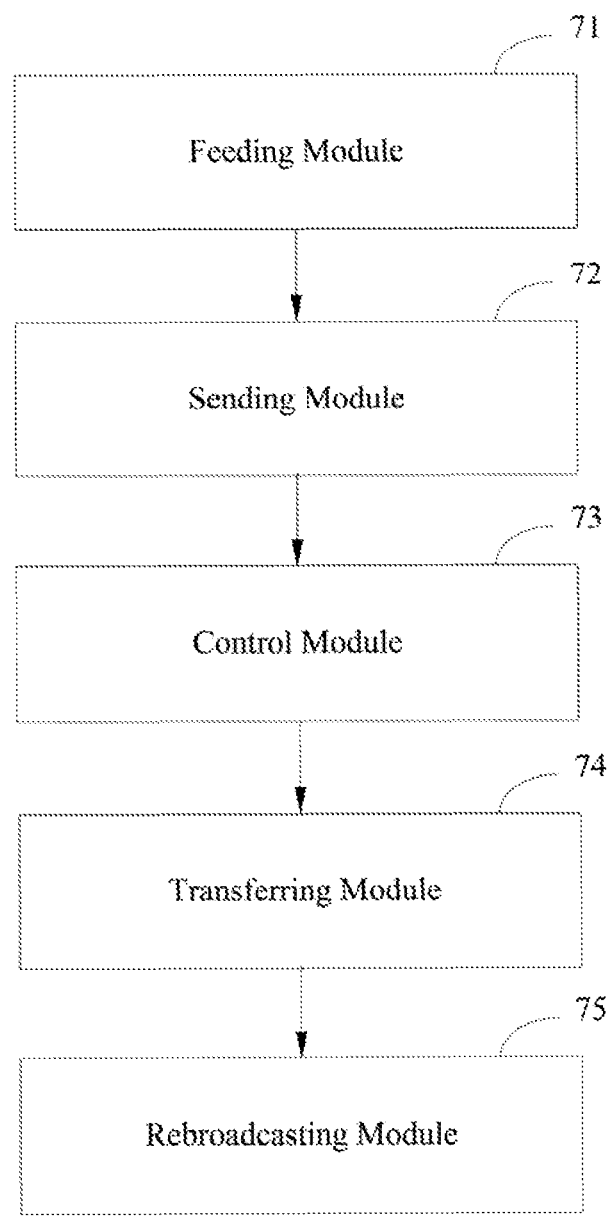
FIG. 7 is a structural block diagram of a device for separating a rebroadcasted video from a live display video provided by an example of the present invention.

FIG. 7 is a structural block diagram of a device for separating a rebroadcasted video from a live display video provided by an example of the present invention, the device may be used in the LED display screen. To easily describe a portion related to Example 7 is only illustrated.

Refer to FIG. 7, a device for separating a rebroadcasted video from a live display video comprises:

a feeding module 71 used for feeding the rebroadcasted video and the live display video of the LED display screen into a video processor by two paths;

a sending module 72 used for completing an aliasing of two paths of the videos through the video processor and sending the aliased video to the LED display control system;

a control module 73 used for the LED display control system controlling a video ration of two paths of the videos and utilizing a high-speed camera to synchronously capture the rebroadcasted video according to the video ratio;

a transferring module 74 used for the LED display control system receiving the rebroadcasted video synchronously captured by the high-speed camera; and a rebroadcasting module 75 used for the LED display control system transforming the rebroadcasted video through image processing into a video which is to be rebroadcasted to different countries.

For one realization way of Example 7, the control module comprises:

a first control unit used for the LED display control system controlling the video ratio of the rebroadcasted video in two paths of the videos to be a first threshold value; and a second control unit used for controlling the video ratio of the live display video in two paths of the videos to be a second threshold value;

wherein the first threshold value is different from the second threshold value, the first threshold value is smaller than the second threshold value.

For one realization way of Example 7, the device further comprises:

a module for arranging a function capable of the video ratio, wherein the function capable of the video ratio specifically comprises:

displaying a video ratio list, wherein the video ratio list comprises a video ratio range;

detecting a first video ratio and a second video ratio designated by a user in the video ratio range; and setting the designated first video ratio to be the video ratio of the rebroadcasted video in the two paths of the videos, setting the designated second video ratio to be the video ratio of the live display video in the two paths of the videos.

For one realization way of Example 7, the rebroadcasting module comprises:

a replacing unit used for replacing a rebroadcasted video with a newly added video; or comprises:

an obtaining unit used for obtaining in real time respectively corresponding language kinds and video stream formats for different countries;

a translating unit used for translating a current language document into a language document of which the type is the same as the type of the language kind, according to the language kind; and a rebroadcasting unit used for transforming the rebroadcasted video into the video which is to be rebroadcasted to different countries, according to the translated language document and the video stream format.

For one realization way of Example 7, the device further comprises:

a module for arranging a function of rebroadcasting switching, wherein the function of the rebroadcasting switching specifically comprises:

receiving a request of rebroadcasting switching; and switching the rebroadcasted video into the live display video according to the request of the rebroadcasting switching, and rebroadcasting the live display video.

Example 8

Figure 8:
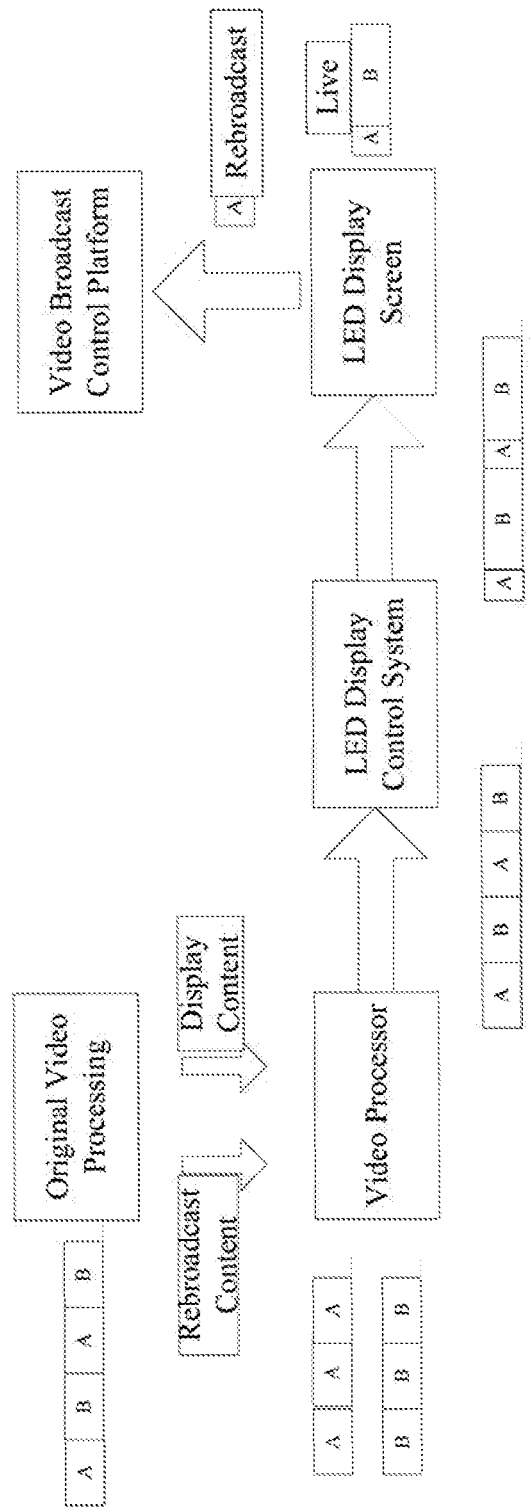
FIG. 8 is a system block diagram of a separation of a rebroadcasted video from a live display video provided by an example of the present invention.

FIG. 8 is a diagram of a system for separating a rebroadcasted video from a live display video provided by an example of the present invention; the detailed description is as follows:

An original video is first subjected to image processing, for example, it is processed according to the video ratio and separated to produce one path of a monochrome video for rebroadcast and one path of a complementary video. For example, the original video is white and separated to produce one path of a monochrome video A1 and one path, of a complementary video B1, the two videos are fed into a video processor to complete an integration process of the video, and then fed into the LED display control system to complete the adjustment of the video ratio.

A high-speed camera captures synchronously the monochrome video A1 of the LED display screen, the contents displayed by the LED display screen is the integration of two paths of the videos, that is, the restored original video.

A video broadcast control platform receives the monochrome video A1 captured synchronously by the high-speed camera, processes in real time the monochrome video, and replaces the monochrome video with the video which is to be, rebroadcasted to different countries.

A device provided by Example 8 of the present invention may be applied to the examples of the aforementioned corresponding method, the details will be described with reference to the examples described above, and will not be described here any more.

From the above description of the examples, it will be apparent to those skilled in the art that the present invention can be implemented by means of software plus the necessary general-purpose hardware. The program may be stored in a readable storage medium, such as random access memory, flash memory, read only memory, programmable read only memory, electrically erasable programmable memory, registers, and the like. The memory medium is located in a memory, and the processor reads the information in the memory and, in conjunction with its hardware, performs the method described in the various examples of the present invention.

The above mentioned are only the embodiments of the present invention, but the scope of the present invention is not limited to these, it will be apparent to those skilled in the art that changes or substitutions which can be easily conceived of within the technical scope of the present invention are intended to be included within the scope of the present invention. Accordingly, it is intended that the scope of the present invention be defined by the scope of the claims.

We claim:

1. A method for separating a rebroadcasted video from a live display video, wherein the method comprises:
   feeding the rebroadcasted video and the live display video of the LED display screen into a video processor by two paths;
   completing an aliasing of two paths of the videos through the video processor, sending the aliased video to a LED display control system;
   controlling by the LED display control system a video ratio of the two paths of the videos, utilizing a high-speed camera to synchronously capture the rebroadcasted video according to the video ratio;
   receiving by the LED display control system the rebroadcasted video synchronously captured by the high-speed camera; and
   transforming by the LED display control system through image processing the rebroadcasted video into a video which is to be rebroadcasted to different countries;
   wherein, the steps that the LED display control system controls a video ratio of the two paths of the videos and utilizes the high-speed camera to synchronously capture the rebroadcasted video according to the video ratio specifically comprise: the LED display control system controls the video ratio of the rebroadcasted video in the two paths of the videos to be a first threshold value; and controls the video ratio of the live display video in the two paths of the videos to be a second threshold value; wherein the first threshold value is different from the second threshold value, the first threshold value is smaller than the second threshold value.

2. The method for separating the rebroadcasted video from the live display video according to claim 1, wherein, the method further comprises:
   arranging a function capable of the video ratio, wherein the function capable of the video ratio specifically comprises:
   displaying a video ratio list, wherein the video ratio list comprises a video ratio range;
   detecting a first video ratio and a second video ratio designated by a user in the video ratio range; and
   setting the designated first video ratio to be the video ratio of the rebroadcasted video in the two paths of the videos, setting the designated second video ratio to be the video ratio of the live display video in two paths of the videos.

3. The method for separating the rebroadcasted video from the live display video according to claim 1, wherein, the step that through image processing the LED display control system transforms the rebroadcasted video into a video which is to be rebroadcasted to different specifically comprises:
   replacing the rebroadcasted video with a newly added video; or
   obtaining in real time respectively corresponding language kinds and video stream formats for different countries;
   translating a current language document into a language document of which the type is the same as the type of the language kind, according to the language kind; and
   transforming the rebroadcasted video into the video which is to be rebroadcasted to different countries, according to the translated language document and the video stream format.

4. The method for separating the rebroadcasted video from the live display video according to claim 1, wherein, the method further comprises:
   arranging a function of rebroadcasting switching, wherein the function of the rebroadcasting switching specifically comprises:
   receiving a request of rebroadcasting switching; and
   switching the rebroadcasted video into the live display video according to the request of rebroadcasting switching, and rebroadcasting the live display video.

5. A device for separating a rebroadcasted video from a live display video, wherein the device comprises:
   a feeding module used for feeding a rebroadcasted video and a live display video of a LED display screen into a video processor by two paths;
   a sending module used for completing an aliasing of two paths of the videos through the video processor and sending the aliased video to the LED display control system;
   a control module used for the LED display control system controlling a video ration of two paths of the videos and utilizing a high-speed camera to synchronously capture the rebroadcasted video according to the video ratio;
   a transferring module used for the LED display control system receiving the rebroadcasted video synchronously captured by the high-speed camera; and
   a rebroadcasting module used for the LED display control system transforming the rebroadcasted video through image processing into a video which is to be rebroadcasted to different countries;
   wherein, the control module comprises: a first control unit used for the LED display control system controlling the video ratio of the rebroadcasted video in two paths of the videos to be a first threshold value; and a second control unit used for controlling the video ratio of the live display video in two paths of the videos to be a second threshold value; wherein the first threshold value is different from the second threshold value, the first threshold value is smaller than the second threshold value.

6. The device for separating the rebroadcasted video from the live display video according to claim 5, wherein, the device further comprises:

a module for arranging a function capable of a video ratio, wherein the function capable of the video ratio specifically comprises:

displaying a video ratio list, wherein the video ratio list comprises a video ratio range;

detecting a first video ratio and a second video ratio designated by a user in the video ratio range; and setting the designated first video ratio to be the video ratio of the rebroadcasted video in the two paths of the videos, setting the designated second video ratio to be the video ratio of the live display video in the two paths of the videos.

7. The device for separating the rebroadcasted video from the live display video according to claim 5, wherein, the rebroadcasting module comprises:

a replacing unit used for replacing the rebroadcasted video with a newly added video; or comprises:

an obtaining unit used for obtaining in real time respectively corresponding language kinds and video stream formats for different countries;

a translating unit used for translating a current language document into a language document of which the type is the same as the type of the language kind, according to the language kind; and a transforming unit used for transforming the rebroadcasted video into the video which is to be rebroadcasted to different countries, according to the translated language document and the video stream format.

8. The device for separating the rebroadcasted video from the live display video according to claim 5, wherein, the device further comprises:

a module for arranging a function of rebroadcasting switching, wherein the function of the rebroadcasting switching specifically comprises:

receiving a request of rebroadcasting switching; and switching the rebroadcasted video into the live display video according to the request of the rebroadcasting switching, and rebroadcasting the live display video.

* * * * *